United States Patent
Rat et al.

(10) Patent No.: US 12,072,048 B2
(45) Date of Patent: Aug. 27, 2024

(54) DEVICE FOR CONNECTING A TUBULAR ELEMENT

(71) Applicant: A. RAYMOND ET CIE, Grenoble (FR)

(72) Inventors: Julien Rat, Rivier Apprieu (FR); Jérôme Chaupin, Bret en Belledonne (FR); Anaïs Deplan, Claix (FR)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 17/759,176

(22) PCT Filed: Jan. 12, 2021

(86) PCT No.: PCT/FR2021/050048
§ 371 (c)(1),
(2) Date: Jul. 20, 2022

(87) PCT Pub. No.: WO2021/148737
PCT Pub. Date: Jul. 29, 2021

(65) Prior Publication Data
US 2023/0349495 A1 Nov. 2, 2023

(30) Foreign Application Priority Data
Jan. 20, 2020 (FR) ........................... 2000539

(51) Int. Cl.
*F16L 33/22* (2006.01)
*F16L 37/088* (2006.01)
(52) U.S. Cl.
CPC ......... *F16L 33/227* (2013.01); *F16L 37/0887* (2019.08); *F16L 2201/10* (2013.01)
(58) Field of Classification Search
CPC . F16L 33/227; F16L 37/0887; F16L 2201/10; F16L 37/092; F16L 37/0926; F16L 37/0927; F16L 47/12
See application file for complete search history.

(56) References Cited

U.S. PATENT DOCUMENTS

| | | | |
|---|---|---|---|
| 2002/0125721 A1* | 9/2002 | Imaeda | F16L 37/0985 285/305 |
| 2004/0262920 A1* | 12/2004 | Le Quere | F16L 37/0925 285/319 |

(Continued)

FOREIGN PATENT DOCUMENTS

| | | |
|---|---|---|
| EP | 1154187 A3 | 2/2002 |
| EP | 0940620 B1 | 5/2003 |

(Continued)

OTHER PUBLICATIONS

International Search Report for International Application No. PCT/FR2021/050048 dated Apr. 29, 2021, 2 pages.

(Continued)

*Primary Examiner* — David Bochna
(74) *Attorney, Agent, or Firm* — TraskBritt

(57) ABSTRACT

A coupling device for a tubular element comprises a hollow body having a housing, a cartridge locked in the housing in a first position, the cartridge then protruding from the hollow body, the cartridge having an outer wall and an inner wall delimiting an inner channel, the inner channel having a first end forming an inlet for receiving the tubular element and a second end provided with an obstacle, an annular seal and a fastening ring disposed in the inner channel in order to secure the tubular element in the inner channel in sealed manner. The coupling device comprises an unlocking system configured to allow, when the tubular element exerts a force against the obstacle, the unlocking of the cartridge and its movement to a second position, in which the cartridge is entirely incorporated in the hollow body.

18 Claims, 6 Drawing Sheets

(56) References Cited

U.S. PATENT DOCUMENTS

| | | | |
|---|---|---|---|
| 2007/0296214 A1 | 12/2007 | Anthoine | |
| 2012/0211977 A1* | 8/2012 | Callahan | F16L 37/144 |
| | | | 285/313 |
| 2015/0145243 A1* | 5/2015 | Dude | F16L 37/0982 |
| | | | 285/308 |
| 2017/0191593 A1* | 7/2017 | Le Quere | F16L 37/0927 |
| 2017/0321825 A1 | 11/2017 | Schuster | |
| 2019/0242510 A1* | 8/2019 | Klein | F16L 37/144 |
| 2020/0347976 A1* | 11/2020 | Guest | F16L 37/092 |
| 2023/0042410 A1* | 2/2023 | Guillard | F16L 37/091 |

FOREIGN PATENT DOCUMENTS

| | | | |
|---|---|---|---|
| EP | 1183480 B1 | 3/2005 | |
| EP | 1559943 B1 | 11/2007 | |
| EP | 1746349 A3 | 8/2009 | |
| EP | 2112416 B1 | 2/2012 | |
| EP | 2249072 B1 | 8/2013 | |
| FR | 2873185 A1 | 1/2006 | |
| FR | 3021089 A | 11/2015 | |
| FR | 3065050 B1 | 4/2019 | |
| JP | 2015094462 A * | 5/2015 | F16L 37/0925 |
| JP | 2016-075308 A | 5/2016 | |
| JP | 2016-075309 A | 5/2016 | |
| JP | 2016-075387 A | 5/2016 | |
| WO | 2018/224588 A1 | 5/2018 | |

OTHER PUBLICATIONS

International Written Opinion for International Application No. PCT/FR2021/050048 dated Apr. 29, 2021, 5 pages.

\* cited by examiner

DEVICE FOR CONNECTING A TUBULAR ELEMENT

CROSS-REFERENCE TO RELATED APPLICATIONS

This application is a national phase entry under 35 U.S.C. § 371 of International Patent Application PCT/FR2021/050048, filed Jan. 12, 2021, designating the United States of America and published as International Patent Publication WO 2021/148737 A1 on Jul. 29, 2021, which claims the benefit under Article 8 of the Patent Cooperation Treaty to French Patent Application Serial No. FR2000539, filed Jan. 20, 2020.

TECHNICAL FIELD

The present disclosure relates to the field of coupling and connecting devices for allowing sealed fluid communication between pipes or lines, in particular, for motor vehicles. It relates, in particular, to a fluidic connection fitting comprising an indicator of correct assembly.

BACKGROUND

In the field of fluidic connectors, it is desirable to have quick-connect coupling devices having indicators of correct assembly, allowing confirmation of the correct assembly of a pipe in the coupling device.

A coupling device generally comprises a substantially cylindrical body delimiting an inner channel forming a housing for receiving a tube. The housing is provided with means for sealingly fixing the end of the tube thereto, typically a fastening member such as a metal ring and an annular sealing element of the annular seal type. The fastening member is responsible for holding the tubular element in place once inserted, while the annular seal is arranged such that it is compressed between a wall of the inner channel and the tubular element so as to ensure a seal between them.

In order for the sealing means to be able to perform their function reliably and efficiently, it is necessary for the end of the tubular element to be driven into the inner channel enough to reach the fastening member and the annular seal. To this end, it is common to simply provide a stop in the inner channel at which the end of the tube abuts when it is driven in sufficiently. The operator responsible for the coupling knows that the end of the tubular element has been sufficiently driven in if he detects that the end of the tubular element has reached the stop. However, the force required to drive in the tubular element is not linear and increases when the end of the tubular element is passing through the fastening member and/or the seal, depending on the coupling operation. The operator may therefore misunderstand this sudden increase in the driving-in force and interpret it as the end of the tubular element reaching the stop. The end of the tubular element thus will not be sufficiently driven in, causing a risk of leakage and/or decoupling of the tubular element.

To remedy this drawback, it is conceived to arrange in the inner channel an element that acoustically indicates a predetermined driving-in of the end of the tubular element into the inner channel. FR 3,065,050 discloses such a coupling device with an acoustic connection indicator. In this document, the annular acoustic indicator deforms when the tubular element is inserted, producing an acoustic signal in the deformed state. An acoustic indicator is also described in EP 1 746 349, JP 2016-75308, JP 2016-75309 and JP 2016-75387.

Such acoustic indicators have drawbacks, particularly when the tubular elements are inserted into the coupling devices by operators in a production line. Such tasks are often performed in noisy environments such as factories, which can prevent the operator from hearing the acoustic signal. Likewise, in the event of fatigue or inattention, and in any event, the operator may not hear the acoustic signal indicating correct assembly, which forces him to drive in the tubular element again or to remove the connection and reassemble it until he hears the signal. This results in a loss of time and additional fatigue for the operator.

FR 3 021 089 sought to solve this problem by providing the acoustic indicator element with a resilient pin arranged to jump against the surface of the tubular element in order to emit an acoustic signal if the tubular element is sufficiently driven in, simply by pivoting the tubular element around its axis. However, although this device allows the operator to repeat the verification of the correct assembly of the tubular element simply by pivoting its end, it still involves detecting an acoustic signal, requiring particular restrictive attention in a noisy environment. Moreover, it is sometimes not possible to rotate the tube or fitting.

JP2016-75308, JP 2016-75309 and JP 2016-75387 also describe coupling devices comprising a visual indicator. In these documents, the tubular element, when inserted into the body, pushes a colored visual indicator until it reaches a stop. The body of the coupling device is transparent here, allowing the operator to see the colored visual indicator, indicating that the tubular element has been correctly assembled.

However, such visual indicators require being able to see, from the outside, the inside of the body of the coupling device. This type of device is therefore not suitable for situations in which the coupling device is already connected to a female element, in which case, the element, partially covering the coupling device, may conceal the visual indicator. Consequently, such devices require connecting the tubular element to the coupling device before integrating the latter into the female element, which is a constraint.

EP 1 183 480 and EP 2 112 416 propose coupling devices comprising viewing openings making it possible to see that the tubular element is assembled correctly. However, since the viewing opening is located at the end-of-travel position of the tubular element, such devices can be difficult to use when the coupling device is already covered by the female element.

Also known from EP 1 559 943 and EP 1 154 187 are coupling devices comprising a visual indicator of correct assembly, wherein inserting the tubular element pushes an element in its path, such as a display ring, which, by deforming, brings out indicators that are visible on the outside of the coupling device. In the same way as before, these designs require the visual indicator to be arranged at the end-of-travel position of the tubular element, which is not practical when the coupling device is integrated in the female element before the insertion of the tubular element.

US 2017/0321825 discloses a coupling device of a tubular element comprising visual indicators of correct assembly of the tubular element, wherein the visual indicators consist of marks arranged on the tubular element. The operator can therefore know whether the tubular element is correctly assembled when a predetermined mark is no longer visible. Such a device has the drawback of incorporating the visual indicator in the tubular element and not in the coupling device, which prevents the use of standard tubular elements and may require the operator to precisely cut the end of the tubular element so that the visual indicator is arranged at a known distance from the end.

Also known from EP 0 940 620 is a coupling device comprising a crimping sleeve intended to be deformed by the insertion of the tubular element and at least one indicator arranged on the crimping sleeve, the indicator moving radially when the tubular element is correctly fitted into the coupling device. This type of visual indicator has the drawback of being visible only at the window where the indicator is located, which forces the operator to orient the coupling device so as to be able to see the indicator. Such a constraint is impractical for the operator, wastes time, and increases the operator's fatigue.

EP 2 249 072 presents a coupling device comprising a haptic indicator of correct assembly of the tubular element. In this document, the inner channel is provided with a stop against which the tubular element exerts a force until the stop breaks, indicating that the tubular element has been properly driven in. This device has the drawback of only offering haptic control of the correct assembly of the tubular element. Verification of this kind is sometimes difficult for an operator to detect, in particular, if he uses gloves, and all the more so when the operator is in a state of significant fatigue. Moreover, it is impossible for the operator to verify the correct assembly a posteriori.

BRIEF SUMMARY

The present disclosure relates to an alternative solution to those from the prior art, which seeks to remedy all or some of the aforementioned drawbacks. It relates, in particular, to a coupling device of a tubular element, comprising a visual indicator of correct assembly of the tubular element, which is simple to implement and verify and usable even when the coupling device is already integrated in a female element.

With a view to achieving this aim, the present disclosure proposes a coupling device of a tubular element, comprising:
  a substantially cylindrical hollow body having a housing that leads into an opening, the housing having a first notch;
  a cartridge locked in the housing in a first position, the cartridge projecting from the opening of the hollow body in the first position, the cartridge having an outer wall and an inner wall that defines an inner channel, the inner channel having a first end that forms an inlet for receiving the tubular element and a second end that is provided with an obstacle, the cartridge further comprising a first retaining member supported by its outer wall and designed to fit elastically in the first notch, in order to hold the cartridge in the first position;
  an annular seal arranged in the inner channel,
  a fastening ring arranged in the inner channel, between the inlet and the seal, for sealingly fixing the tubular element in the inner channel.

The coupling device further comprises an unlocking system designed to allow the cartridge to be unlocked and moved from the first position to a second position, in which the cartridge is fully integrated in the hollow body, when the tubular element, inserted in the inner channel, exerts a force against the obstacle.

According to other advantageous and non-limiting features of the disclosure, taken alone or in any technically practicable combination:

the obstacle is formed by a flexible element that undergoes a deformation when the tubular element, inserted in the inner channel, exerts a force against the obstacle;
  the housing of the hollow body has a second notch and the cartridge comprises a second retaining member designed to fit elastically into the second notch, in the second position;
  the first and second retaining members form a single retaining member;
  the unlocking system comprises the retaining member and the first notch, the retaining member and the first notch being designed such that the minimum force necessary when inserting the tubular element to release the retaining member from the first notch is greater than the force necessary to sealingly fix the tubular element in the inner channel;
  the cartridge comprises an inner tubular member that forms, together with the inner wall, the tubular inner channel;
  the housing of the hollow body has a shoulder, and the unlocking system comprises the shoulder and comprises at least one flexible tab that is supported by the tubular member and forms the obstacle, the flexible tab extending obliquely in the inner channel so as to gradually narrow the channel in an insertion direction, and ending in a lug, the lug abutting the shoulder when the cartridge is in the first position, the force exerted against the flexible tab by the tubular element allowing the release of the lug and the unlocking of the cartridge;
  the unlocking system comprises a plurality of flexible tabs that are distributed evenly at an angle;
  the hollow body comprises an inner tubular member on the side opposite to its opening;
  the cartridge comprises a flexible restrictor tip designed to reduce the diameter of the inner channel at the second end, and to abut the inner tubular member when the cartridge is in the first position;
  the unlocking system comprises the flexible restrictor tip that forms the obstacle, and the inner tubular member;
  the inner wall is provided with a third notch between the inlet and the fastening ring, and the coupling device comprises a substantially cylindrical retaining ring that is inserted into the cartridge, the retaining ring having a third retaining member designed to fit elastically into the third notch and to hold the fastening ring in the inner channel;
  the inner channel is provided with a second annular seal arranged between the inlet and the fastening ring;
  the fastening ring has a tapered inner portion to grip the tubular element when it is inserted and prevent it from being removed;
  the fastening ring is made of metal, preferably of brass;
  the fastening ring is C-shaped;
  the outer wall of the cartridge is provided with a third annular seal to provide a seal between the cartridge and the hollow body;
  the annular seal(s) is (are) made of rubber.

BRIEF DESCRIPTION OF THE DRAWINGS

Other features and advantages of the disclosure may be found in the following detailed description, which makes reference to the accompanying drawings, in which.

DETAILED DESCRIPTION

For the sake of the simplifying the following description, the same reference signs are used for elements that are identical or perform the same function in the different embodiments of the present disclosure.

General Description of the Coupling Device

Figure 1:
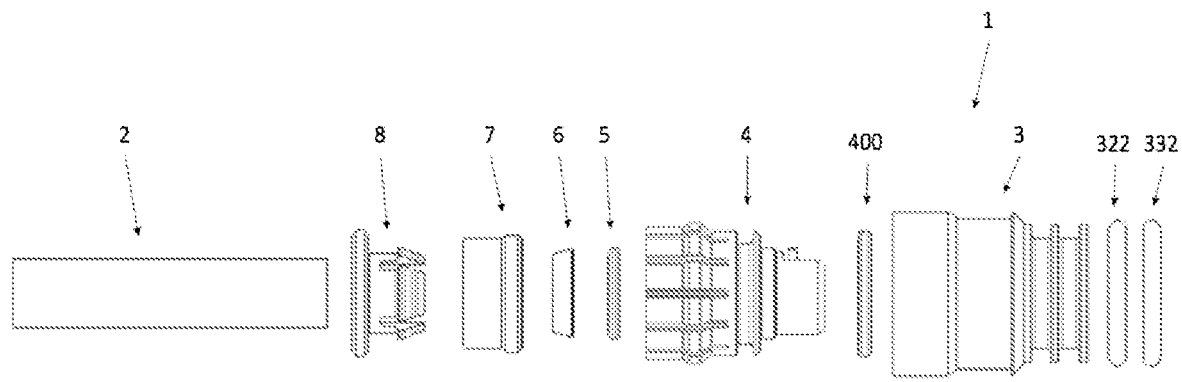
FIG. 1 is an exploded view of a coupling device and a tubular element according to an embodiment disclosed herein.

FIG. 1 is an exploded view of a coupling device according to the disclosure.

In general, the coupling device 1 is intended to fluidically connect, in a removable manner, a tubular element 2 such as a tube, a pipe or a line, in particular, made of a plastic material, to a female element (not shown in the drawing). The fluid can be a liquid, such as water or oil, or a gas, such as compressed air.

Such a coupling device 1 can be used in the automotive field, in particular, for cars or any type of commercial vehicle such as buses, coaches, trucks, trailers or semitrailers, but also in the railway or aeronautical field. In particular, but in a nonlimiting manner, a coupling device 1, according to the disclosure, may be used in the context of air brakes, or even in the context of a cooling circuit of a battery of an electric vehicle.

Returning to the description of FIG. 1, the coupling device 1 comprises a substantially cylindrical hollow body 3 and a cartridge 4.

Figure 2A:
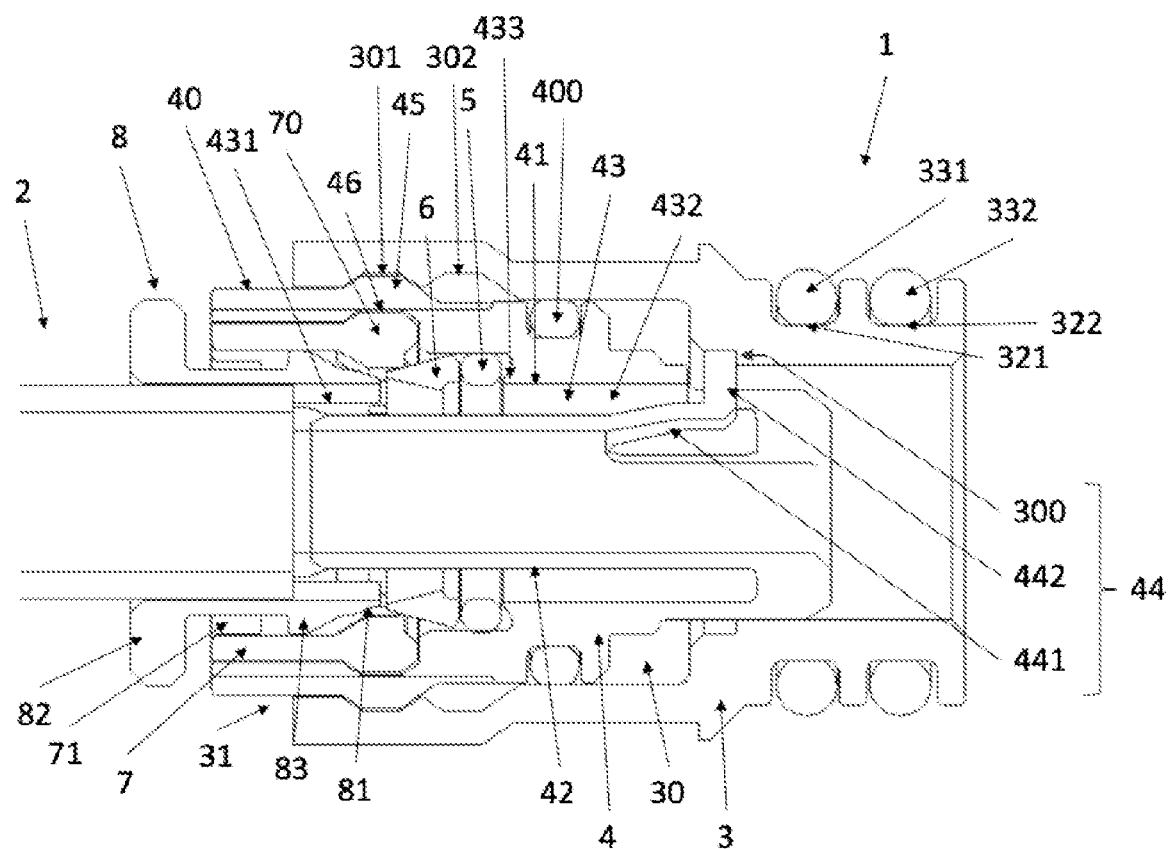
FIG. 2A is a lateral cross-sectional view of a coupling device according to the disclosure when the cartridge is in the first position.
Figure 2B:
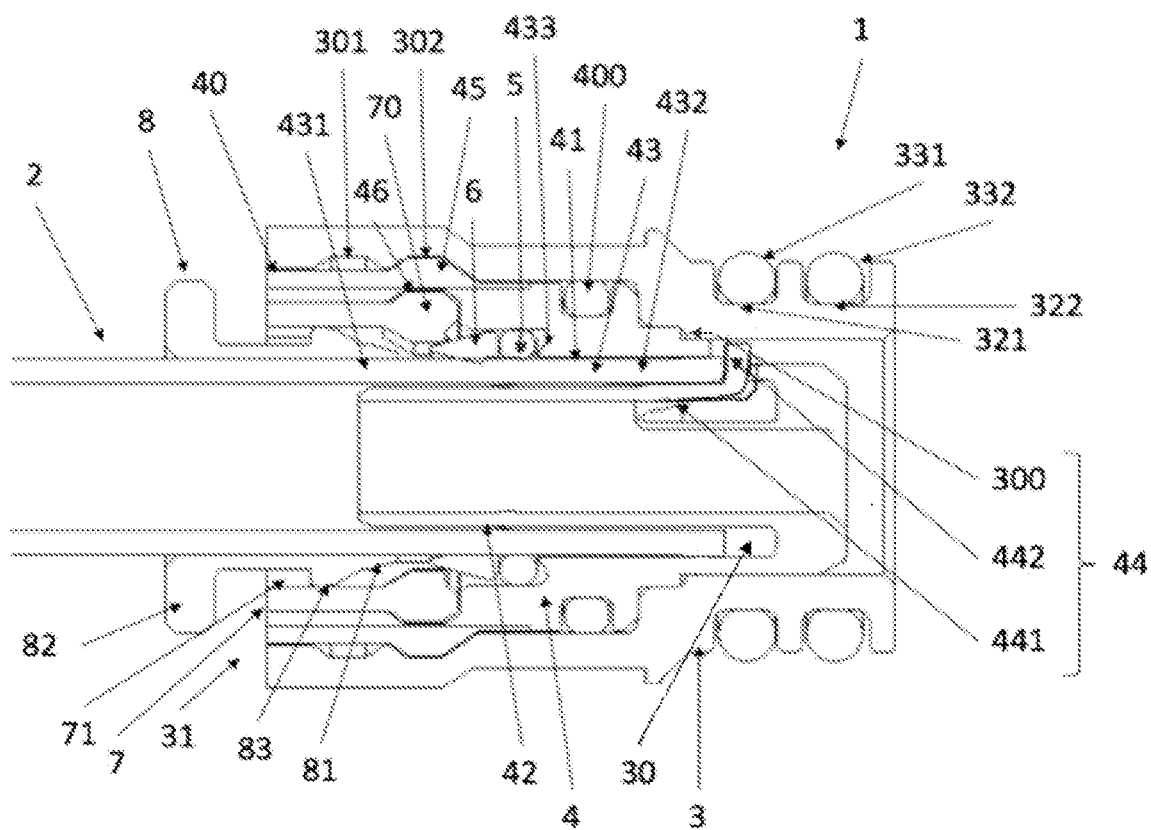
FIG. 2B is a lateral cross-sectional view of a coupling device according to the disclosure when the cartridge is in the second position.

FIGS. 2A and 2B show two lateral cross-sectional views of a coupling device 1 according to the disclosure.

As can be seen in these drawings, the hollow body 3 has a housing 30 leading into an opening 31 to allow insertion therein in an insertion direction, as well as the withdrawal of the cartridge 4.

The outer surface of the hollow body 3 may have one or more grooves 321, 322 to receive one or more outer annular seals 331, 332 in order to ensure a seal with the female element when the coupling device 1 is integrated in the female element.

The cartridge 4, which is substantially cylindrical, has an outer wall 40 shaped to allow insertion of the cartridge 4 inside the housing 30 of the hollow body 3 in the insertion direction.

The outer wall 40 of the cartridge 4 may be provided with an annular seal 400 (hereinafter referred to as the third annular seal 400), preferably made of rubber, making it possible to ensure a seal between the cartridge 4 and the hollow body 3. For this purpose, the outer wall 40 may have a groove shaped to receive the annular seal 400.

The cartridge 4 further comprises an inner wall 41 delimiting an inner channel 43 intended to receive the tubular element 2 inserted in the insertion direction. To this end, the inner channel 43 has a first end 431 forming an open inlet for receiving the tubular element 2, and a second end 432 provided with an obstacle. Advantageous embodiments of obstacles will be developed in the remainder of this description.

Advantageously, the cartridge 4 can also comprise an inner tubular member 42 that forms, together with the inner wall 41, the inner channel 43, which is then tubular. In other words, the inner channel 43 is located between the inner wall 41 of the cartridge and the tubular member 42. The tubular member 42 serves as a guide for the tubular element 2 when the element is inserted, which is particularly useful when the tubular element is made of a flexible material.

The tubular member 42 can be molded on the cartridge 4 so as to be integral therewith, or rigidly secured thereto by any known securing means, such as gluing.

When the tubular element 2 is not inserted, or is not sufficiently inserted, in the inner channel 43 of the coupling device 1, the cartridge 4 is located in a first position in which it projects from the opening 31 such that part of the cartridge 4 is visible from the outside. This situation is shown in FIG. 2A. In order to ensure good visibility of this position, and to allow a user to see the cartridge 4 clearly when it is in the first position, the cartridge 4 can have a color different from that of the hollow body 3.

The cartridge 4 is locked in the housing 30 in the first position. Locked in the housing 30 should be understood to mean that the cartridge 4 cannot be removed from the housing 30 by applying a simple removal force in the direction opposite to that of its insertion into the hollow body 3. To this end, and as is clearly visible in FIG. 2A, the housing 30 of the hollow body 3 can advantageously have at least one first notch 301. The cartridge 4 may comprise at least one first retaining member 45 supported by its outer wall 40 and designed to fit elastically into the first notch 301 in the first position of the cartridge 4. In this way, the cartridge 4 can be fixedly held in this position as long as no force is applied to it, but also in the event that a voluntary or accidental removal force is applied to it. Of course, means other than the first notch 301 and the first retaining member 45 are conceivable for locking the cartridge 4 in the removal direction. It should also be noted that, although the first notch 301 and the first retaining member 45 are shown as a female element and a male element, respectively, they could conversely correspond to a male element and to a female element, respectively, in an embodiment variant.

Locking of the cartridge 4 in the housing 30 also means that the cartridge 4 does not move into the second position (i.e., it does not move in the direction of its insertion into the hollow body 3) as long as the tubular element 2 has not been inserted sufficiently into the cartridge 4 to ensure that it is assembled correctly and that the assembly is sealed.

Thus, locking the cartridge 4 ensures that the cartridge 4 projects from the hollow body 3 and remains visible from the outside when the tubular element 2 is not inserted and as long as it is not sufficiently driven in. Several locking means will be detailed in the remainder of this description, in particular, with reference to three separate non-limiting embodiments of the coupling device 1.

The coupling device 1 further comprises an annular seal 5 arranged in the inner channel 43. Such a seal 5 makes it possible to guarantee sealing of the device 1 when the tubular element 2 is inserted into the inner channel 43, preventing any circulation of fluid in the channel 43 around the tubular element 2.

The coupling device 1 also comprises a fastening ring 6 arranged in the inner channel 43, between the inlet 431 and the seal 5, the assembly making it possible to sealingly fix the tubular element 2 in the inner channel 43 (FIG. 2B). The fastening ring 6 is provided with means for fastening the tubular element 2, making it possible to prevent the element from being removed from the inner channel 43 once inserted. To this end, the fastening ring 6 can advantageously have a tapered inner portion to grip the tubular element 2 when it is inserted and prevent it from being removed, as shown in FIG. 2B. In order to guarantee effective fastening of the tubular element 2, in particular, when it is made of a plastic material, the fastening ring 6 can be made of metal, preferably of brass.

Figure 3:
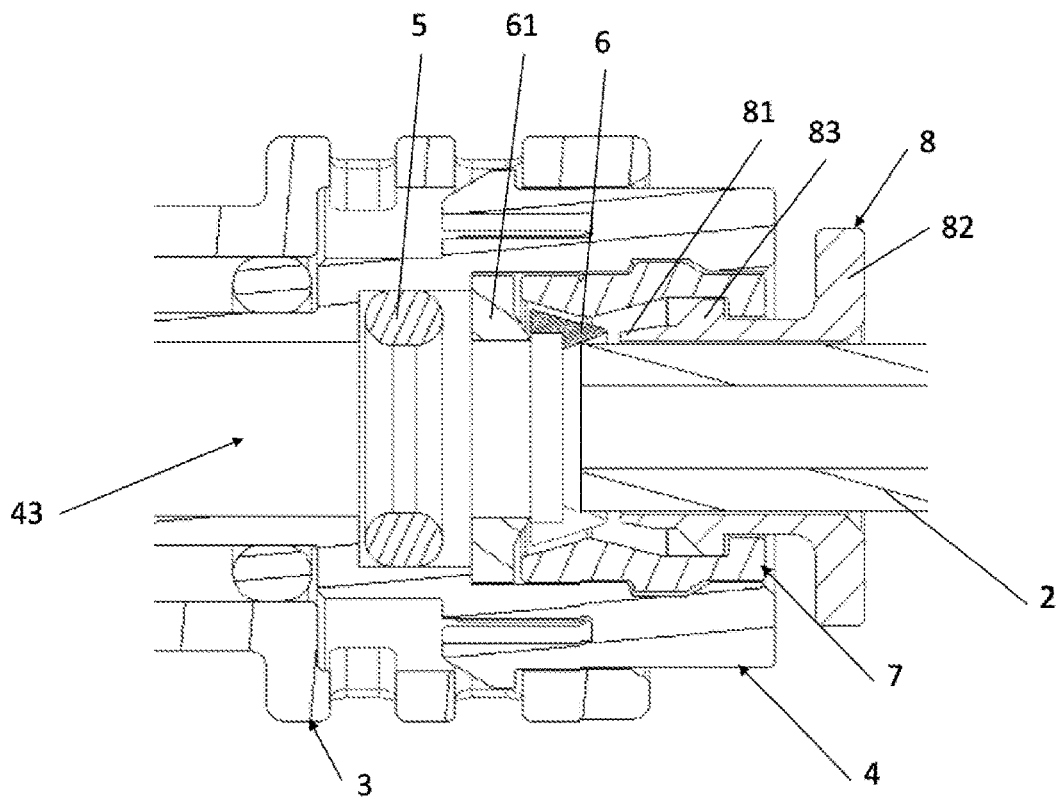
FIG. 3 is a lateral cross-sectional view of a coupling device according to the disclosure when the cartridge is in the first position.
Figure 4:
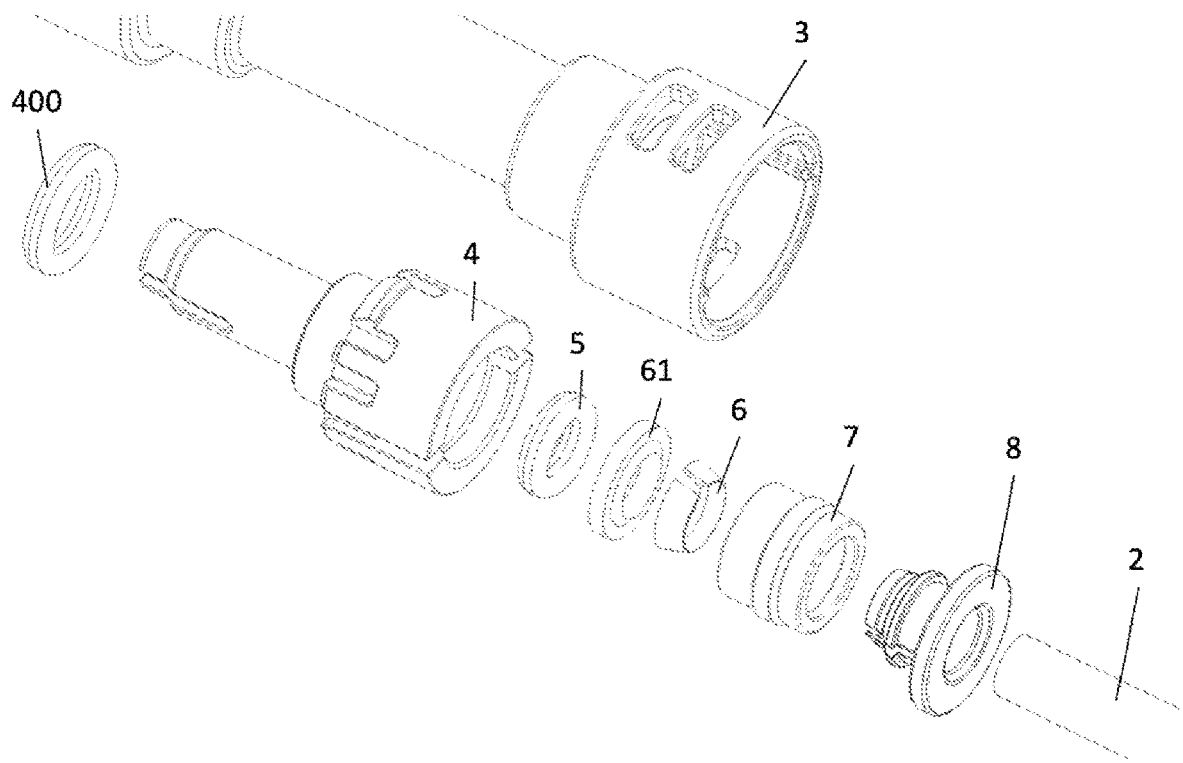
FIG. 4 is an exploded view of a coupling device and a tubular element according to the disclosure.

Advantageously, a cross-member 61 can be arranged between the fastening ring 6 and the annular seal 5. The cross-member has a frustoconical profile on the side of the fastening ring 6, which substantially widens the diameter of the fastening ring 6 when the ring is pressed against the cross-member 61: this situation arises when the tubular element 2 is inserted and comes into contact with the fastening ring 6, as illustrated in FIG. 3. This forced enlargement of the ring 6 facilitates the insertion of the tubular element 2.

The diameters of the annular seal 5 and of the fastening ring 6 are shaped to allow their insertion into the inner channel 43, but also to allow the tubular element 2 to be sealingly fixed in the channel 43. In particular, these diameters can be slightly smaller than the diameter of the tubular element 2, in order to slightly deform the seal 5 and the ring 6 when the tubular element 2 is inserted. Preferably, the materials and/or shapes of the seal 5 and of the ring 6 are adapted to facilitate this deformation. Thus, the annular seal 5 is advantageously formed from an elastic material, such as rubber. The fastening ring 6 may be C-shaped, i.e., consist of a split ring.

The annular seal 5 and the fastening ring 6 may have a diameter slightly greater than the diameter of the inner wall 41 of the cartridge 4, requiring slight compression to insert them into the inner channel 43 and ensure that they are held inside the channel 43.

Particularly advantageously, the inner wall 41 can be provided with a third notch 46 between the inlet 431 and the fastening ring 6. The coupling device 1 then comprises a retaining ring 7, of substantially cylindrical shape, inserted into the cartridge 4. The retaining ring 7 has a third retaining member 70 designed to fit elastically into the third notch 46 and to hold the fastening ring 6 in the inner channel 43. Thus, when the retaining ring 7 is fitted in the cartridge 4, it presses the fastening ring 6 against the first annular seal 5 (or against the cross-member 61, when present), the seal being able to be pressed against a shoulder 433 with which the inner channel 43 is advantageously provided, in order to immobilize the assembly inside the inner channel 43.

The inner channel 43 can be provided with a second annular seal (not shown in the drawings), preferably made of rubber, arranged between the inlet 431 and the fastening ring 6. This second seal, referred to as the "dust cover" seal, makes it possible to ensure the protection of the inner channel 43 and, in particular, of the fastening ring 6 with respect to the outside of the cartridge 4, in particular, preventing dust from entering the inner channel 43. If the coupling device 1 comprises a retaining ring 7, the second seal is inserted between the fastening ring 6 and the third notch 46, such that when the retaining ring 7 is fitted, the second annular seal presses against the fastening ring 6.

Alternatively, to the presence of this second annular seal, and as shown, in particular, in FIGS. 2A and 2B, the coupling device may comprise a removal system 8 for removing the tubular element 2. The removal system 8 has a generally hollow cylindrical shape, the diameter of which is slightly greater than that of the tubular element 2 and of the fastening ring 6 but less than that of the inner wall 41 of the cartridge 4. This allows the removal system 8 to be inserted into the inner channel 43, and the tubular element to pass through the removal system 8 when it is inserted into the coupling device 1.

The removal system 8 has a first pointed end 81, intended to penetrate into the inner channel 43 in the insertion direction, and a second end 82 that forms a head wider than the inlet of the cartridge 4 and projects beyond the inlet to allow it to be handled, so that the first pointed end 81 is remote from the fastening ring 6 when the removal system 8 is not being used. The length of the removal system 8 in the insertion direction is greater than the distance between the inlet of the cartridge 4 and the fastening ring 6.

To allow the removal of the tubular element 2, the removal system 8 is driven in by way of its second end 82 into the inner channel 43, in the insertion direction. The first pointed end 81 is then inserted between the tubular element 2 and the fastening ring 6, slightly separating the fastening ring 6 and releasing its constraint on the tubular element 2, allowing the latter to be removed.

The removal system 8 may comprise a lug 83 intended to be blocked by a complementary lug 71 of the retaining ring 7, in order to prevent the removal of the removal system 8.

Whatever the nature and form of these elements, the coupling device 1 also comprises an unlocking system. When the tubular element 2 is inserted into the inner channel 43 and exerts a force against the obstacle located at the second end 432 of the channel 43, the unlocking system is designed to allow the cartridge 4 to be unlocked and moved from the first position to a second position. In this second position, the cartridge 4 is fully integrated in the hollow body 3 and no longer projects from the opening 31, as shown in FIG. 2B.

In this way, the passage of the cartridge 4 from the first to the second position, easily detectable visually by the disappearance of the cartridge 4 inside the hollow body 3, indicates that the tubular element 2 has been correctly and sufficiently driven into the coupling device 1, i.e., it has passed the fastening ring 6 and the annular seal 5, and necessarily exerted a force against the obstacle located at the second end 432, behind the annular seal 5 in the insertion direction. In other words, a coupling device 1, according to the disclosure, makes it possible to guarantee the correct assembly of the tubular element 2 by the simple visual detection of the disappearance of the cartridge 4 inside the hollow body 3. This disappearance, which is easy to notice in any environment and causes low fatigue on the part of the operator, can be detected even when the coupling device 1 is already connected to the female element, and regardless of the orientation of the coupling device 1.

Advantageously, the housing 30 of the hollow body 3 can have a second notch 302. The cartridge 4 can comprise a second retaining member (not shown), designed to fit elastically into the second notch 302 when the cartridge is in the second position.

Alternatively, the first and second retaining members can form a single retaining member 45, as shown in FIGS. 2A and 2B. In this advantageous embodiment, the retaining member 45 makes it possible to lock the cartridge 4 in the first position as well as in the second position, by cooperating with the first notch 301 and the second notch 302, respectively.

First Embodiment of the Coupling Device

According to a first embodiment of the disclosure, the housing 30 of the coupling device 1 comprises two notches 301, 302 and a single retaining member 45. According to this embodiment, the unlocking system comprises the first notch 301 and the retaining member 45.

As is well known per se, the shape of a notch, and, in particular, its depth or the inclination of its stops, makes it possible to set the minimum force necessary to release the retaining member 45 from this notch.

In this first embodiment, the shape of the first notch 301 and of the retaining member 45 are thus designed so that, when the tubular element 2 is inserted, the minimum force necessary to release the retaining member 45 from the first notch 301 is greater than the force necessary to sealingly fix the tubular element 2 in the inner channel 43.

In other words, the depth of the first notch 301 and the inclination of its stops are adjusted so as to ensure that the insertion of the tubular element 2 initially allows its passage through the fastening ring 6, then its passage through the seal 5, while the cartridge 4 remains locked in the first position, the force not being sufficient to release the retaining member 45 from the first notch 301.

Then, the application by the tubular element 2 of a sufficient force against the obstacle of the second end 432 of the inner channel 43 causes the retaining member 45 to be released, the cartridge 4 to move from the first to the second position, and the retaining member 45 to be elastically fitted into the second notch 302 to lock the cartridge 4 in the second position.

To this end, the obstacle of the second end 432 may consist of a simple stop to receive the thrust force applied by the tubular element 2 after it has passed through the fastening ring 6 and the seal 5.

Such an embodiment makes it possible to ensure that the cartridge 4 is unlocked and moves from the first to the second position only once the tubular element has passed the fastening ring 6 and the seal 5.

Second Embodiment of the Coupling Device

According to a second preferred embodiment of the disclosure, shown in FIGS. 2A and 2B, the cartridge 4 comprises the tubular member 42 described above. In addition, the housing 30 of the hollow body 3 has a shoulder 300.

In this embodiment, the unlocking system 44 comprises the shoulder 300, and at least one flexible tab 441 that is supported by the tubular member 42 and forms the obstacle. More precisely, the flexible tab 441 extends obliquely in the inner channel 43, so as to gradually narrow the channel 43 downstream of the annular seal 5 in the insertion direction. The flexible tab 441 ends with a lug 442 that extends radially outward with respect to the insertion direction. This lug 442 abuts the shoulder 300 when the cartridge 4 is in the first position. The engagement between the lug 442 at the end of the flexible tab 441 and the shoulder 300 causes the cartridge 4 to be locked in the first position, preventing it from moving, in the insertion direction, to the second position.

The force exerted against the flexible tab 441 by the tubular element 2 has the effect of gradually moving the flexible tab 441 away from the inner wall 41 of the cartridge 4 in order to gradually align it along the insertion direction. This moving away of the flexible tab 441 allows the release of the lug 442 from the shoulder 300, and therefore the unlocking of the cartridge 4. The force exerted by the tubular element 2 against the lug 442, which forms a stop, then allows the cartridge 4 to move in the insertion direction up to the second position in which the cartridge is fully integrated in the hollow body 3.

The flexible tab 441, supported by the tubular member 42, can be molded on the tubular member 42 so as to be integral therewith, or secured thereto by any known securing means, such as gluing.

The shoulder 300 may be located at a single location in the housing 30, or extend radially in the housing 30. The unlocking system 44 may comprise a single flexible tab 441, which may be more or less thin depending on the force that is to be imposed to unlock the cartridge 4. Alternatively, the unlocking system 44 may comprise a plurality of flexible tabs 441, distributed evenly at an angle around the tubular member 42, in order to increase the force imposed with respect to a design with a single flexible tab.

In this second embodiment, as illustrated in FIGS. 2A and 2B, the housing 30 of the hollow body 3 and the outer wall of the cartridge 4 may have a first notch 301 and a first retaining member 45, respectively, designed to elastically fit into each other in the first position of the cartridge 4. As already mentioned in the general description of the coupling device 1, this makes it possible to guarantee that the cartridge 4 in held in the first position if a removal force (in a direction opposite to the insertion direction) were applied thereto.

A second notch 302 can also be provided on the housing 30 to engage with the first retaining member 45 so as to block the cartridge 4 in the second position if a force is applied in the removal direction.

Third Embodiment of the Coupling Device

Figure 5A:
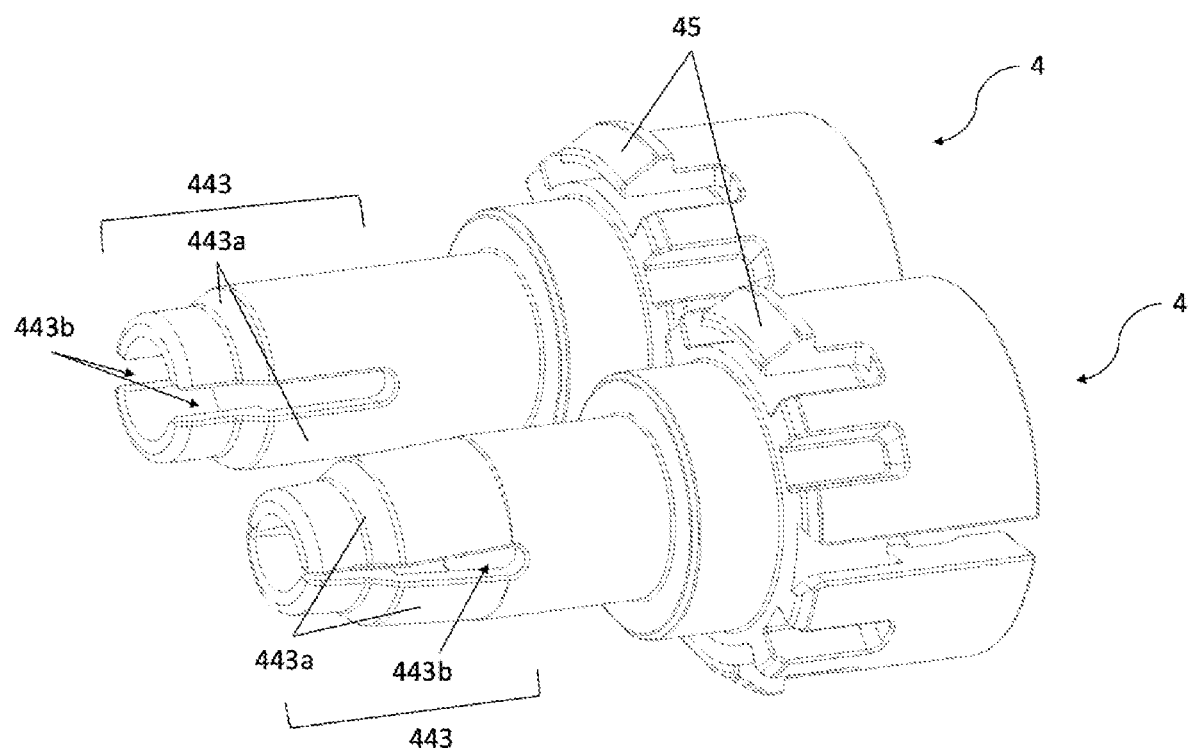
FIG. 5A shows a cartridge of a coupling device according to a particular embodiment of the disclosure.

According to a third advantageous embodiment of the disclosure shown in FIGS. 4 and 5A to 5E, the cartridge 4 comprises, at the second end 432 of the inner channel 43, a flexible restrictor tip 443 designed to reduce the diameter of the inner channel 43. This flexible restrictor tip 443 may, for example, be formed by two cylinder portions 443a in continuity with the wall of the cartridge 4 and separated by longitudinal grooves 443b, which allow the cylinder portions 443a to bend toward the central axis of the cartridge 4 and thus to restrict the diameter of the inner channel 43 (FIG. 5A).

In this embodiment, the unlocking system 44 comprises the flexible restrictor tip 443, which will form the obstacle, and an inner tubular member 32 arranged in the hollow body 3, on the side opposite its opening 31.

Figure 5B:
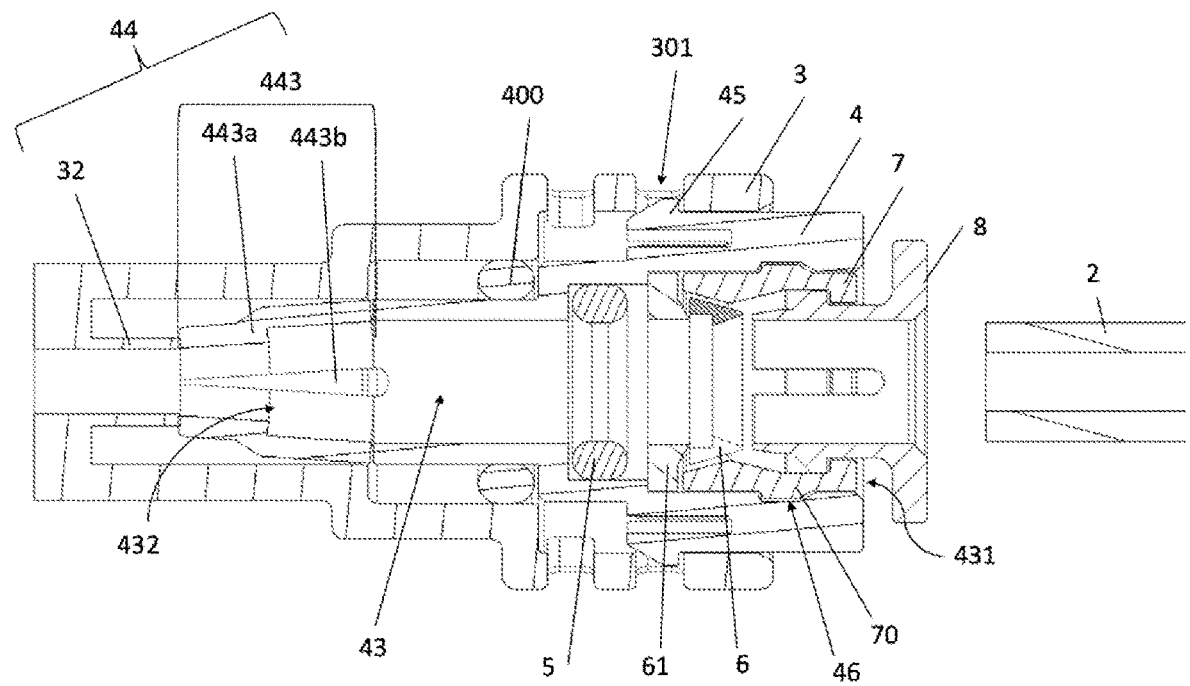
FIGS. 5B to 5E show a coupling device according to a particular embodiment of the disclosure at different stages of insertion of the tubular element, the cartridge being in the first position (FIGS. 5B, 5C, and 5D) and then in the second position (FIG. 5E).
Figure 5C:
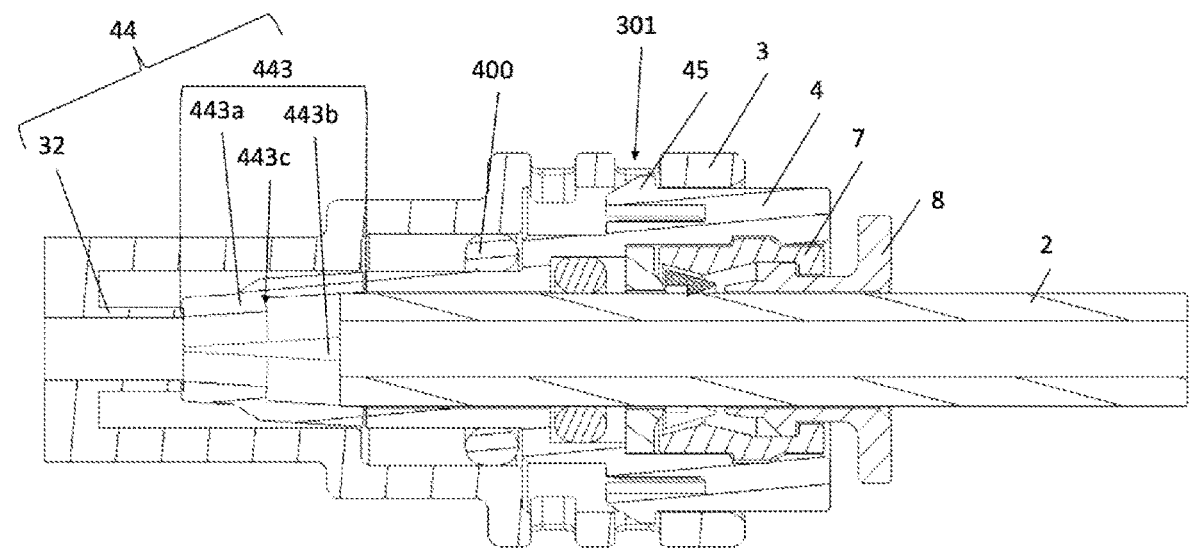
Figure 5D:
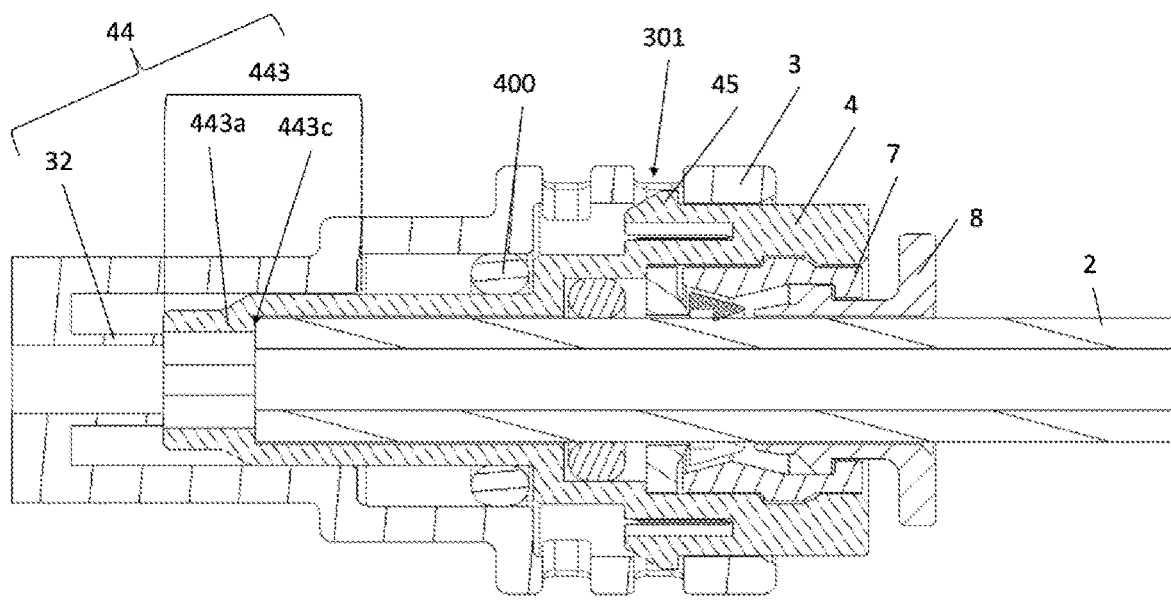
Figure 5E:
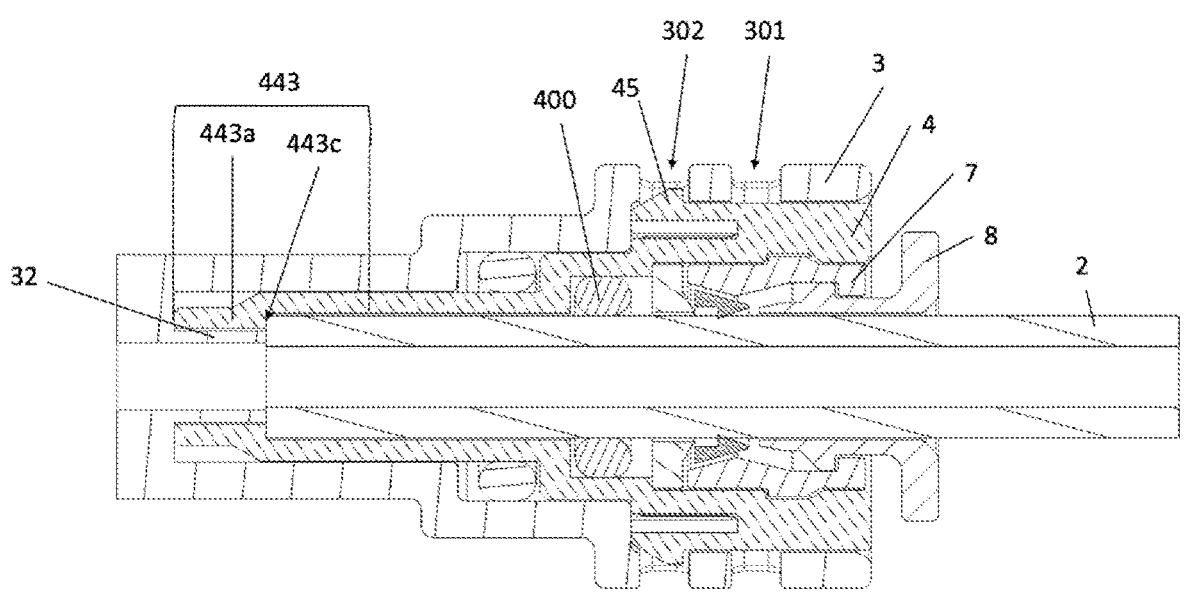

As illustrated in FIG. 5B, the cartridge 4 is locked in the first position: it cannot move into the second position because the end of the flexible restrictor tip 443 abuts the inner tubular member 32 of the hollow body 3, due to its restriction in diameter. When the tubular element 2 is inserted into the cartridge 4 (FIG. 5C), the flexible restrictor tip 443 is therefore in abutment and prevents the cartridge 4 from moving in the insertion direction and from leaving the first position; only the tubular element 2 therefore advances inside the inner channel 43. When the tubular element 2 penetrates the flexible restrictor tip 443, it gradually causes the tip to move away. The diameter of the end of the flexible restrictor tip 443 then increases until the tip no longer abuts the inner tubular member 32 of the hollow body 3: the cartridge 4 is unlocked (FIG. 5D). The tubular element 2 reaches a stop 443c arranged in the internal wall of the flexible restrictor tip 443: the continued insertion of the tubular element 2 then causes the cartridge 4 to move from the first position to the second position, in which the cartridge 4 is fully integrated in the hollow body 3 (FIG. 5E). In the second position, the tubular element 2 abuts the inner tubular member 32, which is surrounded by the end of the flexible restrictor tip 443.

In this third embodiment, as illustrated in FIGS. 5A to 5E, the housing 30 of the hollow body 3 and the outer wall of the cartridge 4 may have a first notch 301 and a first retaining member 45, respectively, designed to elastically fit into each other, so as to ensure that the cartridge 4 is held in the first position if a removal force (in a direction opposite to the insertion direction) is applied to thereto.

A second notch 302 can be arranged in the housing 30 to engage with the first retaining member 45 and thus block the cartridge 4 in the second position, in the removal direction.

Of course, the disclosure is not limited to the embodiments described and it is possible to add variants without departing from the scope of the invention as defined by the claims.

In particular, the disclosure is in no way limited to the examples of unlocking systems provided, and any system ensuring that, when the tubular element is inserted, the tubular element can pass through the fastening ring and seal while the cartridge is locked in the first position, and then that the cartridge is unlocked and can move to the second position, is conceivable.

For example, it would be conceivable for the unlocking system to be a flexible tab that is supported by the hollow body and extends radially inside the housing. In order to constitute an unlocking system, the flexible tab must be sufficiently rigid to constitute a stop that locks the cartridge in the first position as long as the tubular element has not passed through the fastening ring and the seal. Once these elements have been passed through, the tubular element can exert an additional force against a stop that forms the obstacle of the inner channel sufficient to bend the flexible tab and unlock the cartridge.

The invention claimed is:

1. A coupling device of a tubular element, comprising:
a substantially cylindrical hollow body having a housing that leads into an opening, the housing having a first notch;
a cartridge locked in the housing in a first position, the cartridge projecting from the opening of the hollow body in the first position, the cartridge having an outer wall and an inner wall that defines an inner channel, the inner channel having a first end that forms an inlet for receiving the tubular element and a second end that is provided with an obstacle, the cartridge further comprising a first retaining member supported on its outer wall and designed to fit elastically into the first notch in order to hold the cartridge (4) in the first position;
an annular seal arranged in the inner channel;
a fastening ring arranged in the inner channel, between the inlet and the annular seal, to sealingly fix the tubular element in the inner channel, wherein the fastening ring is C-shaped; and
an unlocking system designed to allow the cartridge to be unlocked and moved from the first position to a second position, in which the cartridge is fully integrated in the hollow body when the tubular element, inserted in the inner channel, exerts a force against the obstacle.

2. The coupling device of claim 1, wherein the housing of the hollow body has a second notch, and wherein the cartridge comprises a second retaining member configured to fit elastically into the second notch in the second position.

3. The coupling device of claim 2, wherein the first and second retaining members form a single retaining member.

4. The coupling device of claim 3, wherein the unlocking system comprises the single retaining member and the first notch, the single retaining member and the first notch being configured so that the minimum force necessary, when the tubular element is inserted, to release the single retaining member from the first notch is greater than the force necessary to sealingly fix the tubular element in the inner channel.

5. The coupling device of claim 4, wherein the cartridge comprises an inner tubular member that, together with the inner wall, forms the inner channel, the inner channel being tubular.

6. The coupling device of claim 5, wherein the housing of the hollow body has a shoulder, and wherein the unlocking system comprises the shoulder and comprises at least one flexible tab that is supported by the tubular member and forms the obstacle, the flexible tab extending obliquely in the inner channel so as to gradually narrow the inner channel in an insertion direction, and ending with a lug, the lug abutting the shoulder when the cartridge is in the first position, the force exerted against the flexible tab by the tubular element allowing release of the lug and unlocking of the cartridge.

7. The coupling device of claim 6, wherein the unlocking system comprises a plurality of flexible tabs distributed evenly at an angle.

8. The coupling device of claim 1, wherein:
the hollow body comprises an inner tubular member, on the side opposite to its opening,
the cartridge comprises a flexible restrictor tip configured to reduce the diameter of the inner channel at the second end, and to abut the inner tubular member when the cartridge is in the first position, and
the unlocking system comprises the flexible restrictor tip that forms the obstacle, and the inner tubular member.

9. The coupling device of claim 1, wherein the inner wall includes a third notch between the inlet and the fastening ring, and wherein the coupling device comprises a substantially cylindrical retaining ring inserted into the cartridge, the retaining ring having a third retaining member configured to fit elastically into the third notch and to hold the fastening ring in the inner channel.

10. The coupling device of claim 1, wherein the inner channel includes a second annular seal arranged between the inlet and the fastening ring.

11. The coupling device of claim 1, wherein the fastening ring has a tapered inner portion to grip the tubular element upon its insertion and prevent its removal.

12. The coupling device of claim 1, wherein the fastening ring comprises metal.

13. The coupling device of claim 12, wherein the fastening ring is made of brass.

14. The coupling device of claim 1, wherein the outer wall of the cartridge comprises a third annular seal configured to provide a seal between the cartridge and the hollow body.

15. The coupling device of claim 1, wherein the annular is made of rubber.

16. The coupling device of claim 1, wherein the cartridge comprises an inner tubular member that, together with the inner wall, forms the inner channel, the inner channel being tubular.

17. The coupling device of claim 16, wherein the housing of the hollow body has a shoulder, and wherein the unlocking system comprises the shoulder and comprises at least one flexible tab that is supported by the tubular member and forms the obstacle, the flexible tab extending obliquely in the inner channel so as to gradually narrow the inner channel in an insertion direction, and ending with a lug, the lug abutting the shoulder when the cartridge is in the first position, the force exerted against the flexible tab by the tubular element allowing release of the lug and unlocking of the cartridge.

18. The coupling device of claim 17, wherein the unlocking system comprises a plurality of flexible tabs distributed evenly at an angle.

\* \* \* \* \*